L. CHRISTENSEN.
TRAY ELEVATOR.
APPLICATION FILED OCT. 3, 1908.
1,057,934.
Patented Apr. 1, 1913.
8 SHEETS—SHEET 1.
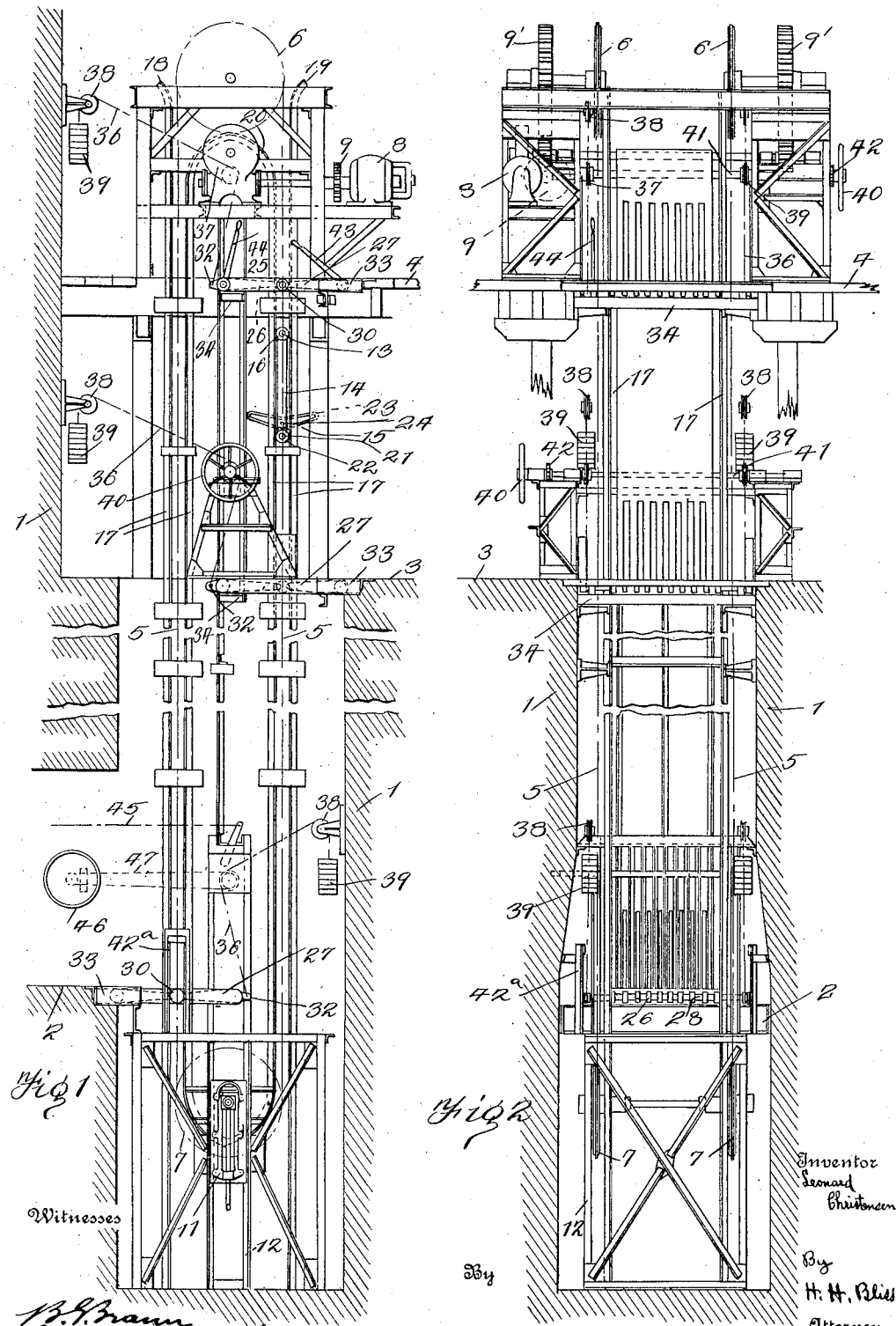

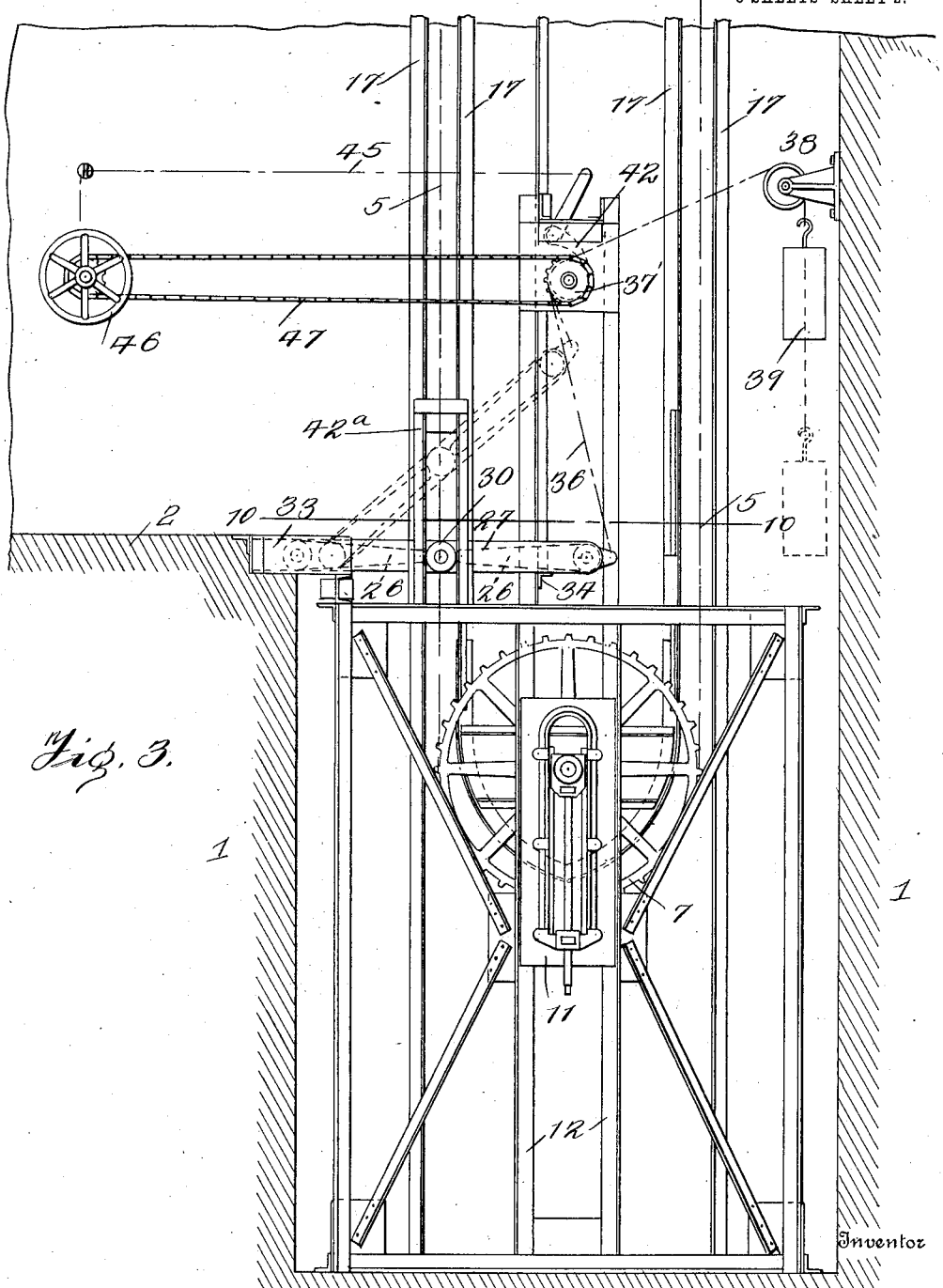

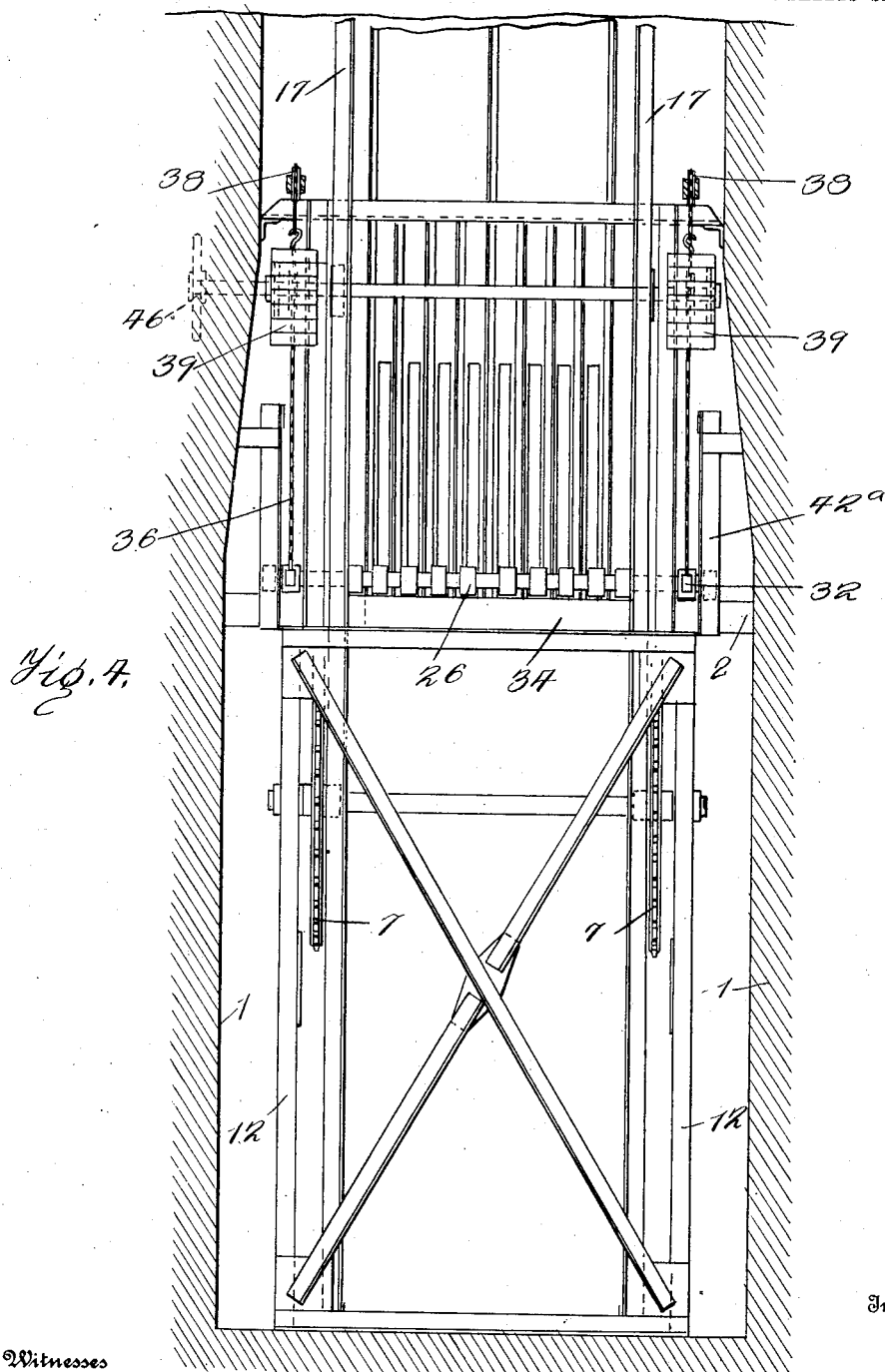

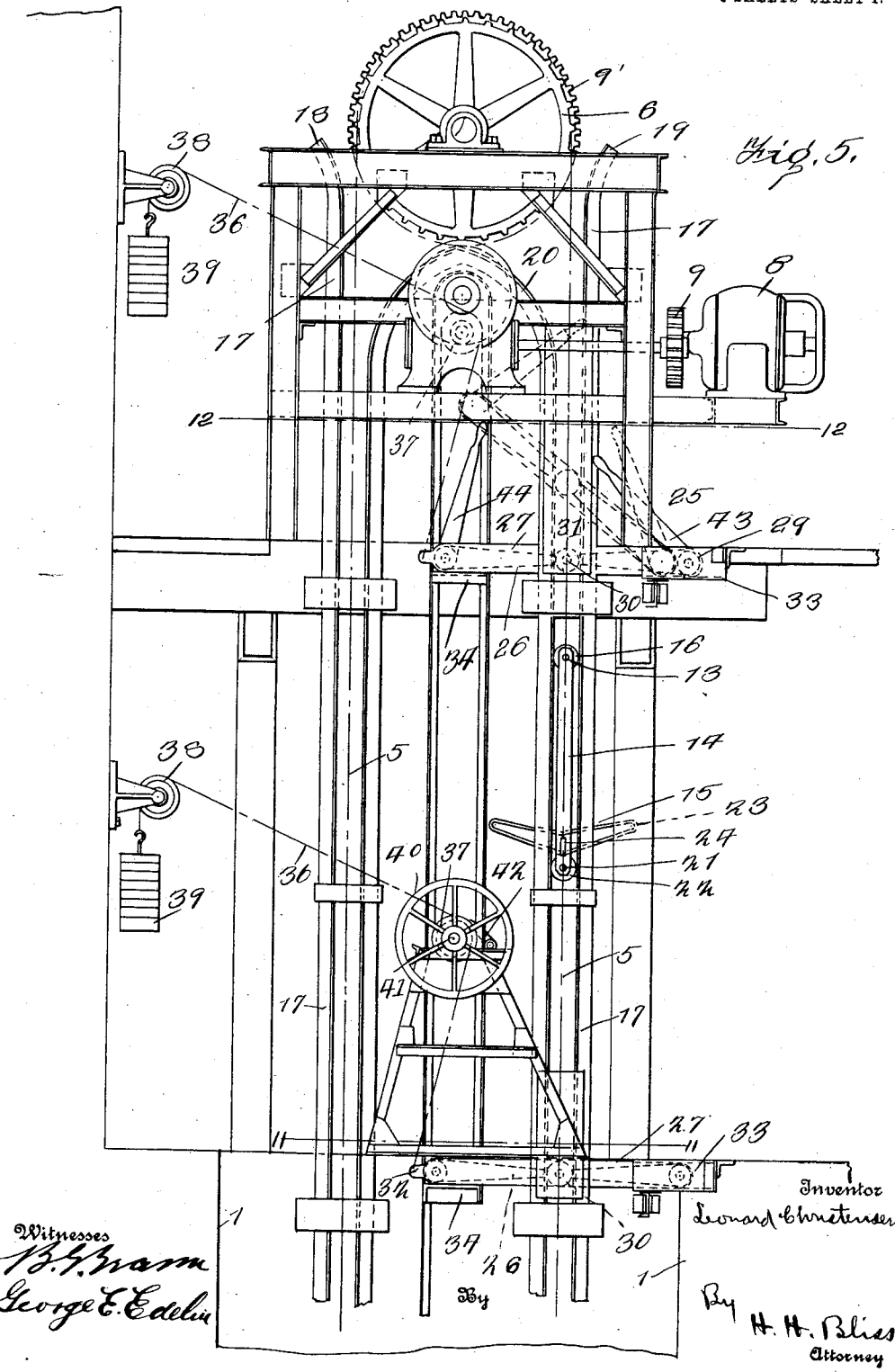

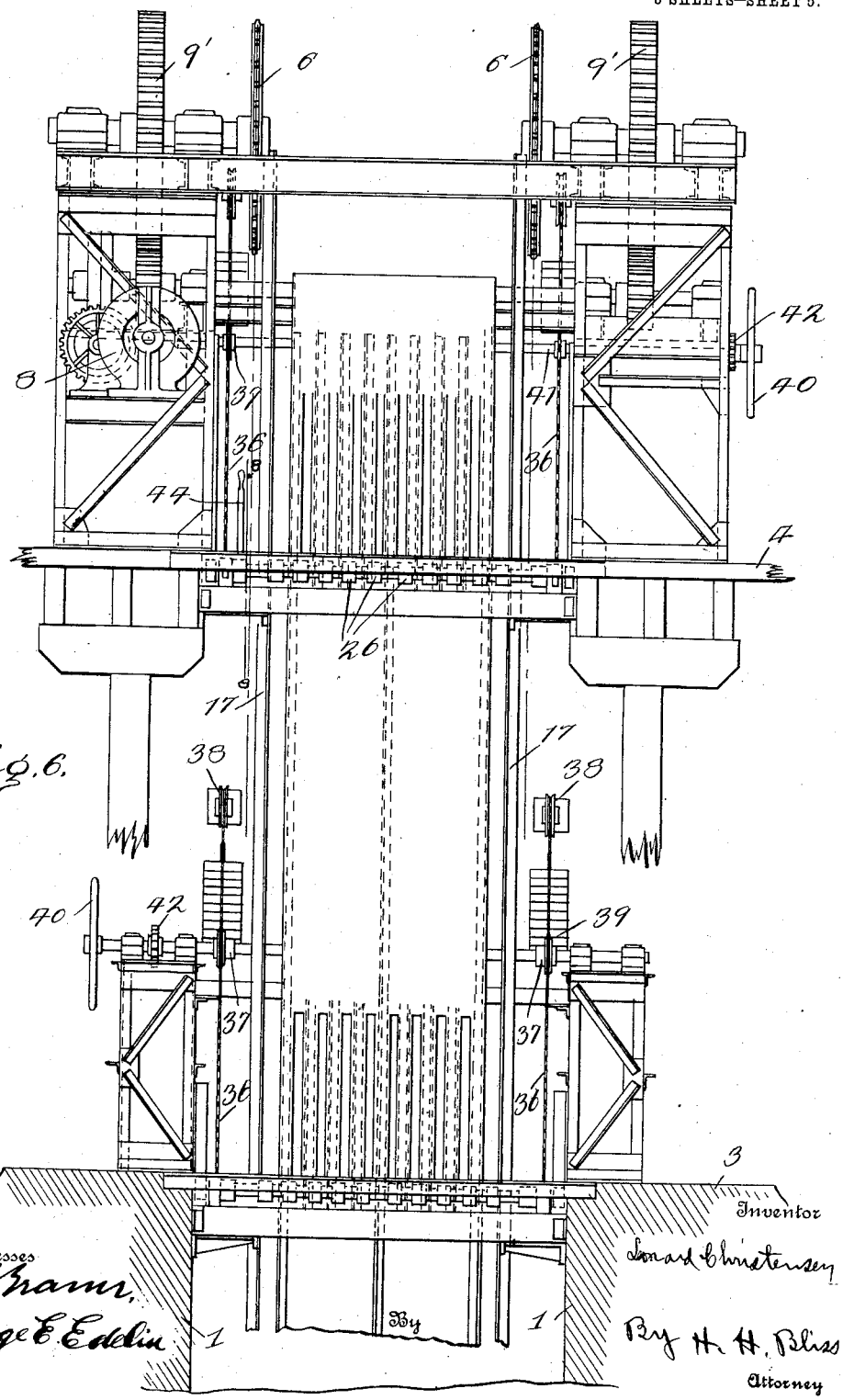

L. CHRISTENSEN.
TRAY ELEVATOR.
APPLICATION FILED OCT. 3, 1908.
1,057,934.
Patented Apr. 1, 1913.
8 SHEETS—SHEET 6.
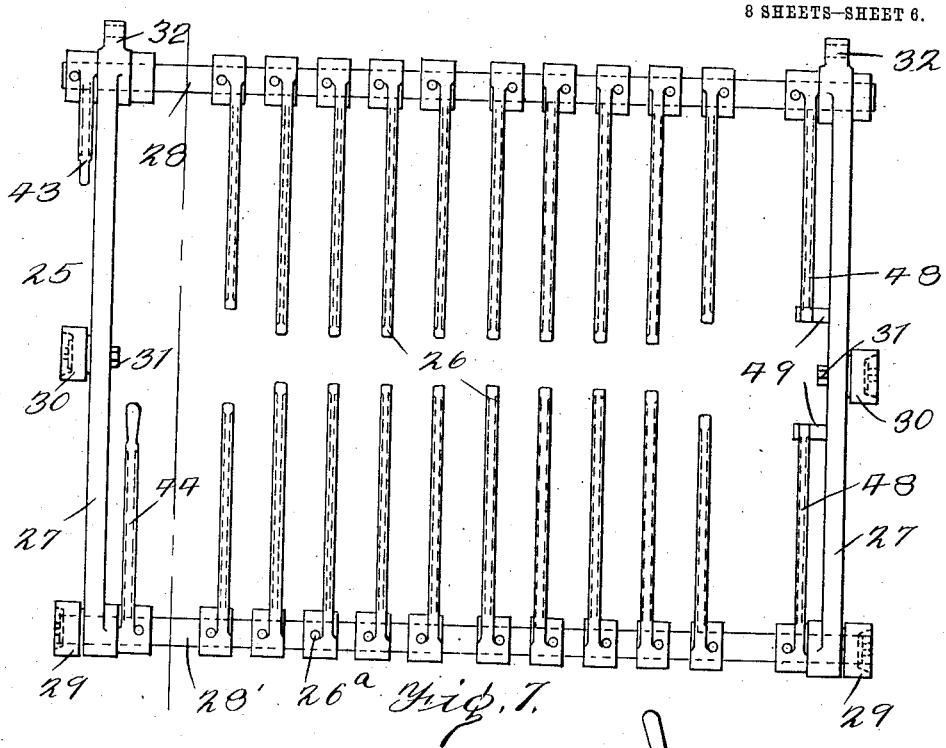
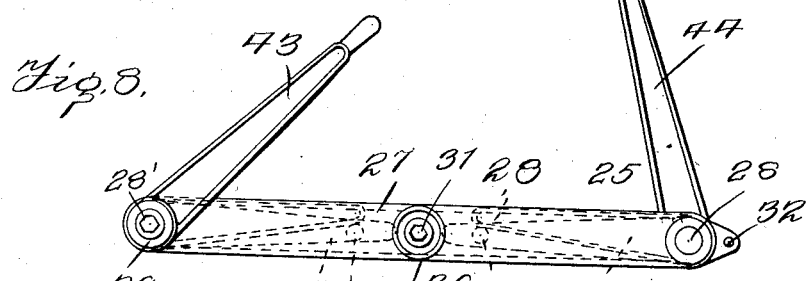
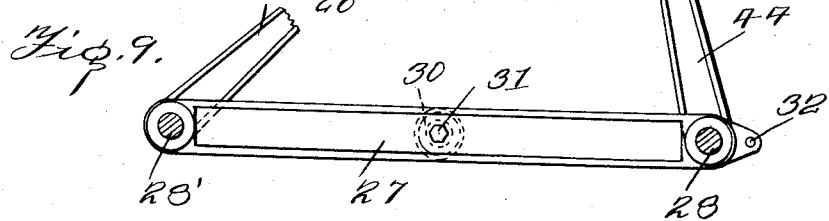
Witnesses
Inventor
Leonard Christensen
By H. H. Bliss
Attorney

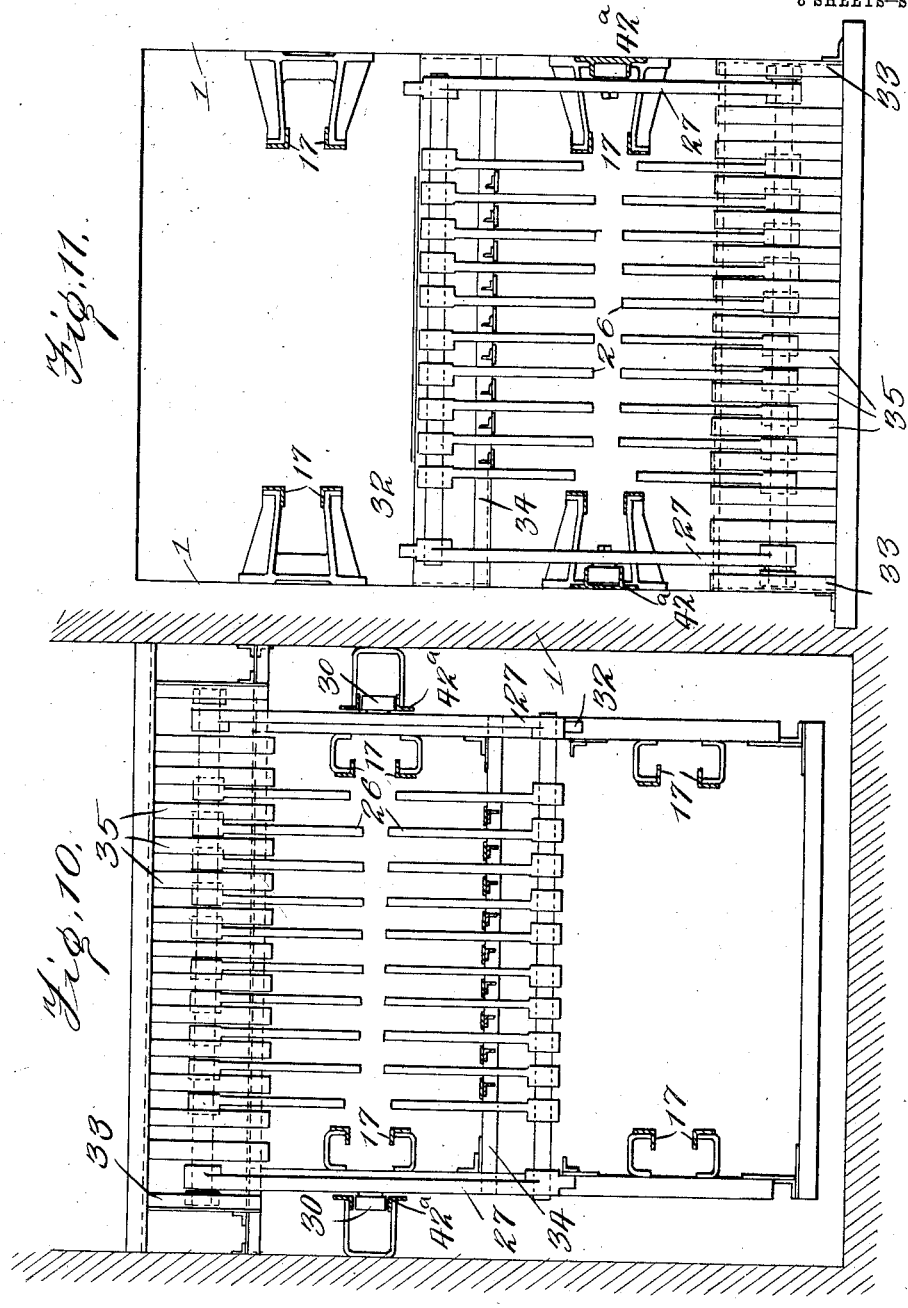

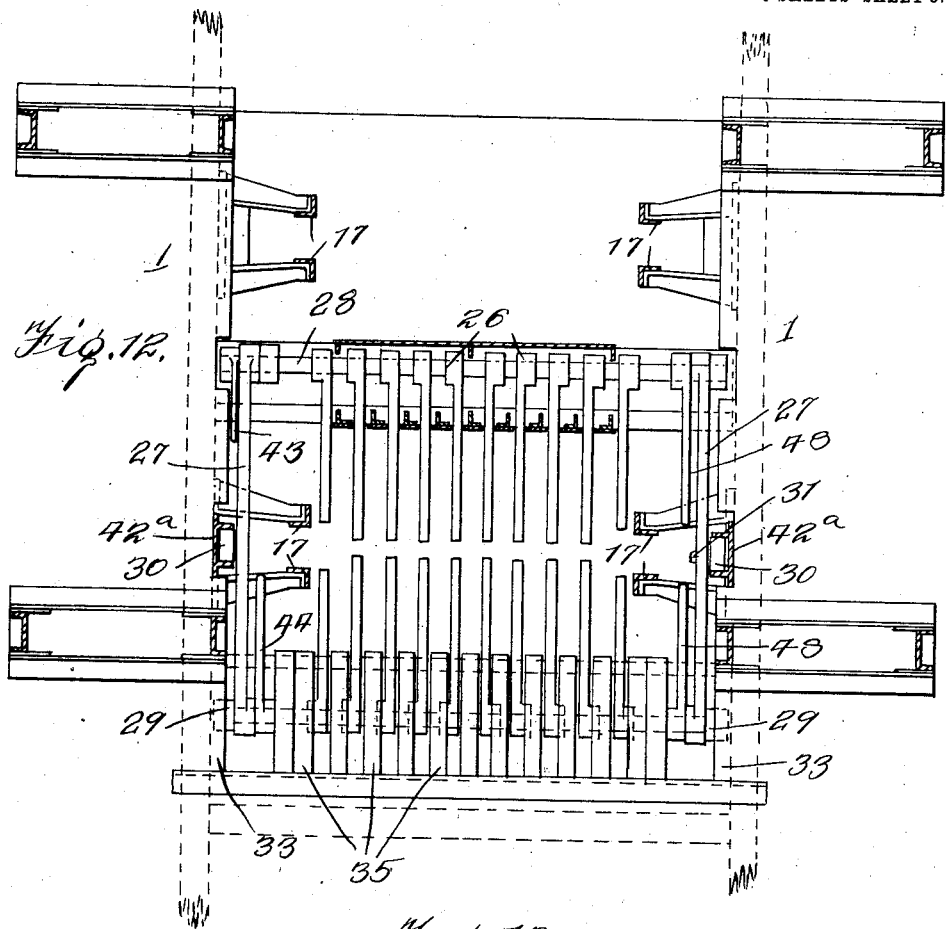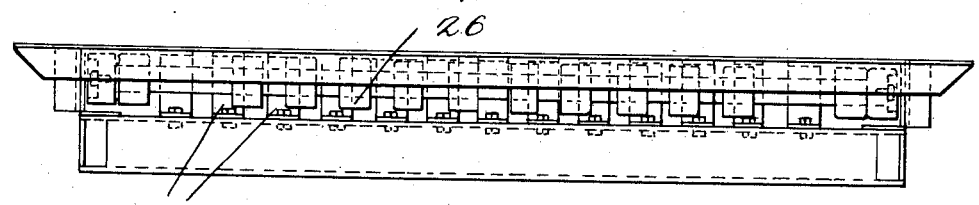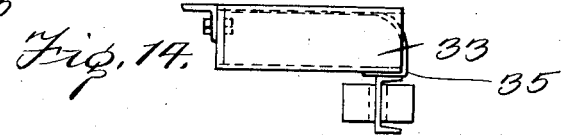

UNITED STATES PATENT OFFICE.

LEONARD CHRISTENSEN, OF COLUMBUS, OHIO, ASSIGNOR TO THE JEFFREY MANUFACTURING COMPANY.

TRAY-ELEVATOR.

1,057,934.  Specification of Letters Patent.  Patented Apr. 1, 1913.

Application filed October 3, 1908. Serial No. 455,938.

*To all whom it may concern:*

Be it known that I, LEONARD CHRISTENSEN, a citizen of the United States, residing at Columbus, in the county of Franklin and State of Ohio, have invented certain new and useful Improvements in Tray-Elevators, of which the following is a specification, reference being had therein to the accompanying drawing.

This invention relates to platform elevators and has for its object to provide a generally improved loading and unloading mechanism and particularly a single mechanism for each floor which may be adjusted to either act as a loading device or as an unloading device, as the operator may determine.

In elevating mechanisms for carrying packages, bundles, boxes, barrels, etc., from one vertical position to another either higher or lower than the first, endless carriers are used consisting of pairs of endless chains between which are pivotally suspended swinging trays composed of a series of parallel fingers. The fingers of these tray carriers pass between similar fingers of platforms at the various landings where the articles are loaded or unloaded. When one of these grid-like platforms is arranged at an inclination to the horizontal, the article upon a descending carrier is caught upon the platform as the fingers of the carrier pass between the platform fingers and it slides under the action of gravity on to the landing. On the other hand when one of these platforms is arranged horizontally and an article is placed in position upon it, the fingers of an ascending carrier lift the article from the platform and convey it to the desired point of unloading.

This invention has for its object to provide an improved platform construction such that the same platform can be arranged either horizontally or at an inclination to the horizontal for purposes of loading and unloading, respectively, thus obviating the necessity of duplication of landings at each level, one at each side of the conveyer, one landing for loading and one landing for unloading purposes, an arrangement which has been commonly used.

To illustrate the mode of applying my invention, I have shown and described herein one concrete practical embodiment of the principles involved, but the scheme is capable of a great many modifications to suit the varying conditions and requirements which must be met in each specific installation.

In the drawings, Figure 1 is a view in side elevation of the conveying mechanism as a whole, parts of the building being shown in section. Fig. 2 is a view in front elevation of the same. Fig. 3 is an enlarged detail view of the lower end of the conveyer, in side elevation. Fig. 4 is a front elevation of the same. Fig. 5 is an enlarged detail side elevation of upper parts of the conveying mechanism. Fig. 6 is a front elevation of the same. Fig. 7 is an enlarged detail plan view of the loading and unloading platform. Fig. 8 is a side elevation of the same. Fig. 9 is a cross section along line 8—8 of Fig. 6. Fig. 10 is a sectional plan view of the lowermost landing along line 10—10 of Fig. 3. Fig. 11 is a sectional plan view of the second landing along the line 11—11 of Fig. 5. Fig. 12 is a sectional plan view of the upper landing along the line 12—12 of Fig. 5. Figs. 13 and 14 show the grill bars and connections at the landings.

1—1 indicate the parts of the building adjacent the conveyer shaft. 2 designates the lowermost landing floor, 3 the second landing situated upon the opposite side of the shaft and 4 an upper landing on the same side of the conveyer shaft as the second landing.

The two endless chains 5—5 pass over the sprockets 6—6 at the upper end and 7—7 at the lower end of the conveyer mechanism. The upper sprockets 6—6 are each driven by the electric motor 8 through the power transmitting gearing 9—9': These sprockets 6 are mounted in suitable framework each upon its own shaft, the two shafts being axially in alinement. The space between the sprockets is left free and unobstructed by any framework or mechanism whatever. Lower sprockets 7—7 are mounted in vertical movable bearing blocks 11 which slide in guide ways 12, and a spring or weight suitably connected to the bearing block is utilized to maintain the chains taut at all times.

Between the chains are suspended the article carriers. Each of these carriers comprises a pair of stub shafts 13 one carried by each of the chains respectively, the pair of suspension bars 14 each pivotally hung from one of these short shafts respectively and adjacent its corresponding chain, and the carrier proper 15 rigidly secured to the suspension bars 14 at each end. Upon each stub shaft 13 is also mounted a guide roller 16 which engages with the guide angles 17—17 upon each side. These guide angles extend from top to bottom of the conveyer mechanism and hold the chain to a straight vertical path. At their upper and lower ends the guide angles are suitably curved and shaped as at 18—19—20 to permit the trays, while making the upper and lower turns, to be swung about their axes of suspension without causing the suspension bars 14 to be deflected from vertical positions.

The lower end of each of the suspension bars 14 carries a short shaft 21 upon which is journaled a lower guide roller 22 which also engages the guide angles 17—17 and serves to prevent oscillation of the suspension bars at all times except when the carriers are making the turn at either end of the run of the conveyer. The carrier proper 15 is provided with the outwardly extending fingers 23 which project in either direction from the central frame bar 24 extending from one of the suspension bars 14 to the other.

It will now be evident that bags, boxes, barrels and other articles can be readily carried from any point along one side of the path of the endless conveyer to any other point along the run of the conveyer without the same falling from the carrier or being otherwise disturbed in transit.

At each of the three floors or landings shown in the drawings is arranged a combination loading and unloading mechanism. All of these mechanisms are alike in their general manner of construction and operation and while there are slight differences between the individual loading and unloading mechanisms due to the special requirements of any particular floor, a description of any one of these will suffice to illustrate the principle of my invention.

Selecting the mechanism at the upper landing as a type, the loading platform is seen to comprise a horizontally arranged rectangular frame structure 25 and a series of parallel fingers 26 mounted upon the frame, through which the carrier fingers are adapted to pass without interference. The frame structure of the platform has transverse end bars 27 joined by the rock shafts 28, journaled in bearings formed in the ends of the bars 27. The fingers 26 are mounted in regular series upon the rock shafts. One end of each of the fingers is enlarged and provided with a transverse circular opening, by means of which the end of the finger is sleeved upon the rock shaft. The fingers are fixed against angular rotation and longitudinal displacement with respect to the rock shaft by means of the pins 26ª which have a taper fit with the rock shaft and finger. Upon the ends of one of the rock shafts 28' and beyond its supporting bearings the rollers 29 are loosely carried. The fingers are arranged in two series each of the series projecting inwardly from one of the rock shafts but stopping short of the center line of the platform as a whole. In this manner an open space from one end bar 27 to the other is left which is unobstructed by any part of the platform and through this space the central frame member 24 of the carrier can freely pass. The rollers 30 are mounted upon stub shafts 31 projecting horizontally outward in opposite directions from the end bars 27 and arranged axially in the vertical plane passing centrally between the inner ends of the two series of platform fingers. The end bars 27 are provided at the end opposite the roller 29 with perforated lugs 32 for a purpose to be presently described.

The loading and unloading platform is supported at one end upon the fixed trackways 33—33 and at the other end upon the transverse horizontal platform 34 which extends centrally across the conveyer shaft from one side wall to the other. The grill bars 35 are arranged horizontally and fixedly secured to the framework of the building and lie with their upper faces in the same horizontal plane with the upper edges of the platform fingers so that a box or bundle may be readily pushed from the grill bar platform to the loading platform. To each of the lugs 32 a lifting cable 36 is secured which is passed around one of the cable sheaves 37, thence carried to and around one of the sheaves 38 and supports at its other end one of the suspended weights 39—39. The sheaves 37 can be rotated in unison by means of the hand-wheel 40 mounted on the shaft 41 which also carries the sheaves. The pawl and ratchet mechanism 42 prevents the rotation of the sheaves in a direction to lower the platform and since the pawl is within easy reach of an operator it can be manually lifted from position when it is desired to lower the platform from the unloading to the loading position. The weight 39 is designed to nearly but not quite counterbalance the empty platform when it is raised to this inclined position. Any tendency to motion would therefore be in a downward direction so far as the loading platform is concerned and this is prevented by the pawl and ratchet mechanism.

The rollers 30 are caused to follow a straight vertical path by means of the vertically arranged guide angles 42ª. The tracks 33 are sufficiently long to provide a run-way for the rollers 29 which will support the latter in all positions of the platform. By operating the hand-wheel 40 the inner end of the platform is elevated to the position shown in dotted lines in Fig. 5. The rollers 29 move toward the conveyer shaft a short distance and the unobstructed space between the ends of the two series of fingers travels upwardly in the same plane, i. e., the vertical plane in which the rollers 30 are compelled to remain. It will thus be seen that whether the platform is in its horizontal position or inclined position, the central frame structure of the carriers will freely pass between the platform fingers.

Levers 43—44 are rigidly secured to the rock shafts 28—28' so that when it is desired to permit a carrier with its bundle to pass by the landing, the platform fingers can be rotated about the axis of the rock shaft to which they are secured whether the platform is in either loading or unloading position, until they assume a position entirely out of the path of the carriers so that the bundles will not be interfered with while passing. The fingers are normally held in the horizontal plane of the platform frame by means of the arms 48 rigidly mounted upon the rock shafts 28—28' to lie parallel with the fingers, and the stops 49—49 with which these arms normally engage.

The construction at the other two landings have been shown as modified in some slight respects due to the particular conditions which it is necessary to meet. The pawl of the pawl-and-ratchet mechanism at the lowermost landing is provided with a tripping chain 45 to illustrate the construction which would be necessary if it were impossible to reach the pawl from the sides of the conveyer shafts. For a similar reason, the hand-wheel 46 is shown mounted on a shaft parallel to, and displaced horizontally from, the shaft of the cable sheaves 37', and the two are geared together by means of the chain 47. No levers are shown on the rock shafts of the platform either at this landing or at the second landing, as the conveyer is designed to carry articles always upwardly from either of these two landings and never from a point below either of them. In fact these two landing platforms are typical of that which would be the usual construction at the lowermost landing upon either side of the endless conveyer and the construction of the loading and unloading mechanism at the upper landing is typical of what would usually be followed in principle at all landings other than these two lowermost ones. The operation of this conveyer will be readily understood. If it is desired to send articles from the lowermost landing 2 to the upper landing 4, the loading platform at the former station is placed in horizontal position, the article to be carried is moved horizontally and inwardly thereupon, the platform at the upper landing is placed in inclined position with the fingers lying in the plane of the platform frame; the conveyer is set in motion in such direction that the carriers pass upwardly through the platform at the lower landing. If now it is desired to carry articles from the same lower landing to the second landing 3, the platform at the latter station is placed in inclined position and the levers 43—44 of the upper platform are pulled to throw the fingers entirely out of the path of the carriers and the conveyer is operated in the same direction as before.

When it is desired to send articles from either one of the upper landings to the lower landing the direction of the conveyer is reversed the lower landing platform is placed in an inclined position and the platform at the landing from which the articles are being carried is placed in the horizontal loading position. If the latter landing is other than the uppermost landing it will of course be necessary to throw the platform fingers of all the landings above it out of the path of the carriers. If however the operator forgets to throw the platform fingers out of the path of the carriers at any one of the landings above the loading landing, the bag, bundle or other article on an ascending carrier will raise the fingers which have thus been left in operative position, and will pass between the two series of raised fingers which latter will then automatically resume their normal position.

What I claim is:

1. In a vertically moving conveying mechanism, the combination of an endless carrier, a series of flights carried thereby, each comprising a medial longitudinal frame structure, and a series of parallel fingers projecting in opposite directions therefrom, a horizontally arranged loading and unloading platform having two sets of fingers projecting inwardly toward each other, leaving an unobstructed central space between them through which the central medial frame structure of the flights is designed to pass, means for raising one end of the loading and unloading platform to cause it to assume an inclined position, means causing the other end to simultaneously move in approximately the same horizontal plane, and means for maintaining the central unobstructed space between the ends of the fingers of the platform in the same vertical plane as the platform is moved from one position of adjustment to another.

2. In a platform elevator, a combined loading and unloading platform adapted to lie in either a horizontal or an inclined position, rollers carried by one end of the platform adapted to engage with relatively horizontal track ways, and rollers carried medially of the platform adapted to engage vertical track ways.

3. In a vertically moving conveyer mechanism, the combination of an endless carrier, a series of flights carried thereby, each comprising a medial longitudinal frame structure and a series of parallel fingers projecting in opposite directions therefrom, a horizontally arranged loading and unloading platform having two sets of fingers projecting inwardly toward each other, leaving an unobstructed central space between them through which the central medial frame structure of the flights is designed to pass, means for tilting the loading and unloading platform to cause it to assume an inclined position, and means for maintaining the central horizontal longitudinal line of the platform in the same vertical plane and preventing it from lateral displacement as the platform is tilted.

4. In a vertically moving conveying mechanism, the combination of an endless carrier, a series of flights carried thereby, each comprising a series of substantially horizontal parallel fingers, a horizontally arranged loading and unloading platform having a series of fingers through which the fingers of the flight are designed to pass, means for adjusting the platform from its horizontal to an inclined position, and means for preventing the central horizontal longitudinal lines of the platform from being horizontally displaced during such movement of adjustment.

5. In an endless flight conveying mechanism, the combination of a series of article-transporting devices each having a series of article-supporting fingers, a platform frame having fingers through which the fingers of the article-supporting devices are adapted to pass and which is movable from a horizontal position to an inclined position and vice versa, means for maintaining one part of said platform in the same horizontal plane irrespective of the position as to inclination of the frame as a whole, and a grill bar stationary platform, the individual bars of which project between the fingers of the platform frame and are adapted to receive articles from the said platform when in an inclined position and from which articles are adapted to be moved on to the platform when the latter is in a horizontal position.

6. In a platform elevator, a combined loading and unloading platform adapted to lie in either a horizontal or an inclined position, means for placing said platform in an inoperative position, rollers carried by one end of the platform adapted to engage with relatively horizontal trackways, and rollers carried medially of the platform adapted to engage vertical trackways.

7. In a vertically moving conveyer, the combination of an endless carrier, a series of flights, a combined loading and unloading platform adapted to lie in either a horizontal or an inclined position, and means for maintaining the central portion of the said platform through which the flights pass in the same vertical plane as the platform is moved from one position of adjustment to another.

In testimony whereof I affix my signature, in presence of two witnesses.

LEONARD CHRISTENSEN.

Witnesses:
H. B. ALEXANDER,
E. J. HADDOCK.

---

Copies of this patent may be obtained for five cents each, by addressing the "Commissioner of Patents, Washington, D. C."